United States Patent [19]

Allersma

[11] 4,218,512

[45] Aug. 19, 1980

[54] STRENGTHENED TRANSLUCENT GLASS-CERAMICS AND METHOD OF MAKING

[75] Inventor: Ties Allersma, Pittsburgh, Pa.

[73] Assignee: PPG Industries, Inc., Pittsburgh, Pa.

[21] Appl. No.: 862

[22] Filed: Jan. 4, 1979

[51] Int. Cl.[2] .............................................. C03C 21/00

[52] U.S. Cl. .......................................... 428/410; 65/33

[58] Field of Search .......................................... 65/33; 428/410

[56] References Cited

U.S. PATENT DOCUMENTS

| | | | |
|---|---|---|---|
| 2,920,971 | 1/1960 | Stookey | 106/39.7 |
| 3,253,975 | 5/1966 | Olcott et al. | 428/410 |
| 3,454,386 | 7/1969 | Ernsberger | 65/33 |
| 3,464,807 | 9/1969 | Pressau | 65/33 |
| 3,464,880 | 9/1969 | Rinehart | 428/410 |
| 3,625,718 | 12/1971 | Petticrew | 106/39.7 |
| 3,756,798 | 9/1973 | Ernsberger | 65/33 |
| 3,764,444 | 10/1973 | Simmons | 65/33 X |
| 3,846,099 | 11/1974 | Simmons | 65/33 X |

OTHER PUBLICATIONS

"Glass Ceramics—Theory & Practice," J. J. Hammel & T. Allersma, Wiss. Ztschr. Friedrich-Schiller-Univ. Jena, Math.-Nat. R., 23 Jg. (1974), H. 2.

*Primary Examiner*—Arthur D. Kellogg

*Attorney, Agent, or Firm*—Dennis G. Millman

[57] ABSTRACT

Glass-ceramic articles which are translucent are strengthened by creating a surface compression layer by controlling the crystallization process to yield different crystalline forms at the surface and in the interior.

9 Claims, No Drawings

STRENGTHENED TRANSLUCENT GLASS-CERAMICS AND METHOD OF MAKING

BACKGROUND OF THE INVENTION

There has been a need for a translucent material having a low thermal expansion coefficient, high thermal shock resistance, thermal stability and relatively high impact strength. A product having such a combination of physical properties would be highly desirable for use in windows of wood-burning stoves, for example. It is the object of this invention to provide such a product.

A known class of materials which possess low thermal expansion coefficients, high thermal shock resistance and thermal stability are the glass-ceramics, also known as crystallized glasses. Glass-ceramics are articles in which a major crystalline phase is dispersed in a glassy matrix, at least 50 percent of the bulk of the article usually being comprised of the crystalline phase. The articles are produced from a crystallizable glass and are subsequently subjected to a post-forming heat treatment in order to induce crystallization within the body of the glass. The resulting glass-ceramic articles have lower coefficients of thermal expansion and better resistance to thermal shock than the crystallizable glasses from which they are formed. Glass-ceramic articles may be substantially transparent or opaque, depending upon the particular crystal species produced in the final product. During the crystallization heat treatment, the glass first crystallizes to an intermediate crystalline phase called beta-eucryptite, which is relatively transparent, and thereafter transforms to beta-spodumene, which may be accompanied by opacification. Transformation to the beta-spodumene crystal form improves the strength of an article, but not to the extent desired. Additional information regarding the basic nature of crystallizable glass compositions, glass-ceramics, and methods of making may be found in U.S. Pat. No. 2,920,971 to S. D. Stookey and in U.S. Pat. No. 3,625,718 to R. W. Petticrew.

Various attempts have been made in the prior art to strengthen crystallizable glasses or glass-ceramics. It is well known, for example, that a brittle material such as a glass or glass-ceramic may be strengthened by the introduction of permanent, compressive stresses in its surface layer. For example, glass-ceramics may be tempered by known techniques for vitreous glasses, i.e., thermally or by surface ion exchange. However, the surface compression produced by these techniques tends to dissipate at relatively low temperatures, thereby rendering them unsuitable for strengthening articles intended to be used in high temperature applications.

Another prior art approach to inducing surface compression stresses in crystallizable glass compositions is to differentially crystallize surface portions of the glass article while retaining the interior portion of the article in the glassy state. Variations of this technique are disclosed in the following references: U.S. Pat. No. 3,253,975 (Olcott et al.), U.S. Pat. No. 3,454,386 (Ernsberger), U.S. Pat. No. 3,464,807 (Pressau), and U.S. Pat. No. 3,464,880 (Rinehart). Because the strengthened articles produced by each of these prior art techniques retains the bulk of the article in the glassy state, such articles do not possess the low thermal expansion coefficients and thermal shock resistance required for use in high temperature applications.

U.S. Pat. No. 3,756,798 to F. M. Ernsberger discloses a method for inducing compressive stresses in the surface portion of a glass-ceramic article during the crystallization heat treatment by inducing early crystallization in surface portions of the article by exposure to water vapor which acts as a crystallization catalyst. Because crystallization entails a volume shrinkage, the subsequent crystallization of the interior portion of the article creates a compressive stress in the previously crystallized surface portions. The crystal species at both the surface and interior is beta-eucryptite, although it is also mentioned that an opaque product could be made with beta-spodumene at the surface and beta-eucryptite in the interior. To produce significant strengthening with such a method on a commercial scale, a costly heating chamber capable of supplying superheated steam would be required rather than the conventional kiln.

SUMMARY OF THE INVENTION

It has now been found that a relatively transparent, strengthened glass-ceramic article may be made with a surface layer of beta-eucryptite and an interior of beta-spodumene. The difference in the crystal forms between the surface portions and the interior is achieved by means of a carefully controlled crystallization heat treatment schedule. It has been discovered that when a crystallizable glass composition is first converted to beta-eucryptite and then to beta-spodumene, the conversion of beta-eucryptite to beta-spodumene in surface portions of the article tends to take place at a slower rate than in the interior of the article. This lag in the crystallization at the surface is believed to be caused by slight compositional differences in the surface portion of the crystallizable glass, apparently due to the loss of relatively volatile species during the forming, annealing, and crystallizing of the article.

Thus, in the present invention the glass is first heated to a temperature at which beta-eucryptite forms, and is held at that temperature until the conversion to beta-eucryptite is substantially complete. Then the temperature is increased to induce the conversion of beta-eucryptite to beta-spodumene, and that temperature is sustained for a period of time sufficient to drive a substantial majority of the bulk of the article to beta-spodumene, but insufficient to convert a substantial amount of the beta-eucryptite in the surface portions of the article. At this carefully determined point of the crystallization heat treatment schedule, the glass article is quickly cooled to stop the crystallization processes, thereby yielding a substantially fully crystallized glass-ceramic article whose dominant crystal species in the interior is beta-spodumene and whose dominant crystal species in the surface portions is beta-eucryptite.

The coefficient of thermal expansion is negative for both of these crystal forms but is more negative for beta-eucryptite than for the beta-spodumene. Therefore, as the article cools from the crystallization temperature, the outer eucryptite-containing portions of the article expand more than the interior spodumene-containing portions, thereby creating compressive stresses in the surface portions and strengthening the article.

Furthermore, by thus halting the crystallization process just prior to the conversion of surface portions from eucryptite to spodumene, it has been found that the resultant article retains a substantial degree of transparency, transmittance to visible light up to about 70 percent or more being attainable.

Another aspect of the present invention involves improving the yield of a process for heat treating a large number of crystallizable glass articles simultaneously so as to produce the crystallized, strengthened, transparent articles of the invention. When heat treating a plurality of crystallizable glass articles in a kiln in accordance with a precisely determined heat treating schedule, it has been found to be extremely difficult to assure that each article within the kiln experiences precisely the same heat treatment schedule, due to lack of temperature uniformity in the kiln. As a result, it is often found in a batch of heat treated articles that a substantial portion have recrystallized excessively to the spodumene form, thereby losing strength and transparency, while in other articles, insufficient conversion to the spodumene form has taken place to generate a significant surface compression stress. It has been found that this problem may be significantly reduced by means of a specially adapted heat treatment schedule when processing a plurality of articles in a kiln or the like. This schedule entails a thorough crystallization of the glass to the beta-eucryptite form by maintaining the kiln temperature for a relatively long period of time at a temperature suitable for crystallizing beta-eucryptite, but lower than a temperature at which beta-spodumene is formed. Thus, the articles throughout the kiln become equilibrated in temperature conditions as well as their crystallization state. Then the temperature is increased at a relatively slow rate to a temperature at which recrystallization to beta-spodumene takes place. The slow increase from the previously equilibrated condition minimizes thermal imbalances in the kiln, thereby initiating the formation of beta-spodumene relatively uniformly among all of the articles in the kiln. The temperature at which recrystallization to beta-spodumene is carried out is selected to be no higher than necessary, so as to prevent excessive conversion to beta-spodumene in hotter portions of the kiln.

DETAILED DESCRIPTION

Crystallizable glass compositions and methods for producing glass-ceramic articles are known in the art, and specific reference may be had to the aforementioned U.S. Pat. Nos. 2,920,971 (Stookey) and 3,625,718 (Petticrew), the disclosures of which are hereby incorporated by reference.

In general, the crystallizable glass compositions for use in the present invention may be characterized as having essential inclusions of $SiO_2$, $Al_2O_3$, and $Li_2O$ as crystal-forming constituents, ZnO as a melting aid, and $TiO_2$ or a mixture of $TiO_2$ and $ZrO_2$ as nucleating agents. An excessive amount of nucleating agent should be avoided to prevent uncontrollably rapid crystallization. The alkali metal content of the glass-ceramics is minimized, although a small amount of $K_2O$ is typically included. Small amounts of melting and fining aids, such as fluorine, chlorine, antimony, or arsenic may also be included. The presence of arsenic and/or antimony has also been found to have a beneficial effect when subsequently stain decorating the crystallized articles. An example of a crystallizable glass composition is as follows:

| Ingredient | Percent by Weight | |
|---|---|---|
| | Range | Preferred Embodiment |
| $SiO_2$ | 67-73 | 70.22 |
| $Al_2O_3$ | 18-21 | 19.21 |
| $TiO_2$ | 1.4-5.0 | 2.15 |
| $ZrO_2$ | 0-2.0 | 1.58 |
| $Sb_2O_3$ | 0-1.0 | 0.38 ($Sb_2O_5$) |
| $As_2O_5$ | 0-1.0 | 0.01 |
| $Li_2O$ | 2.5-5.0 | 3.99 |
| $Na_2O$ | 0-1.0 | 0.30 |
| $K_2O$ | 0-1.0 | 0.27 |
| $Cl_2$ | 0-0.2 | — |
| ZnO | 0.5-2.0 | 1.59 |
| $F_2$ | 0-0.5 | 0.24 ($F^-$) |
| MgO | 0-3.0 | 0 |
| CaO | 0-4.0 | 0 |
| $P_2O_5$ | 0-1.5 | 0 |

A glass of the above preferred composition may be melted from the following batch ingredients:

| Ingredient | Parts by Weight |
|---|---|
| Silica | 700 |
| Hydrated alumina | 296 |
| Lithium carbonate | 83 |
| Zinc zirconium silicate | 31 |
| Zinc oxide | 10.5 |
| Titanium dioxide | 15.0 |
| Lithium fluoride | 13.5 |
| Soda ash | 4.0 |
| Lithium sulfate | 6.0 |
| Potassium carbonate | 2.5 |
| Antimony oxide | 4.0 |
| Total | 1165.5 |

These materials may be melted on a continuous basis in a refractory melting chamber, from one end of which, in one embodiment, a ribbon may be withdrawn and formed into a flat sheet of glass by rolling in accordance with techniques similar to the conventional plate glass method. Following forming, the glassy sheet is cooled and cut to the desired size. Optionally, the glassy sheet also may be ground and polished. Since a specific, contemplated use for the product of the invention is for glazing windows in high temperature environments, the articles described herein are in the form of sheets or plates, but it should be understood that other conventional glass forming techniques (blowing, casting, drawing) may be employed to produce other types of articles.

Crystallization of the formed, glassy sheets (or other shaped articles) takes place in a heat treatment chamber (e.g., a kiln) into which the sheets are placed at room temperature. The temperature is steadily raised over a period of several hours to about 700° C. or higher, which temperature is maintained for several hours to nucleate crystallization sites within the glass and to initiate formation of beta-eucryptite. The temperature is then increased to about 860° C., which is approximately the minimum temperature for beta-spodumene formation, or slightly higher. Preferably, crystallization is carried out until the article is at least 95 percent by weight crystal phase, with no more than 5 percent remaining as a glassy phase. In its final state, the crystalline phase is a solid solution of beta-spodumene and silica. By employing a minimum temperature for beta-spodumene crystallization, the crystallization process can be halted by reducing the temperature more precisely at the critical time when the majority of the article has assumed the beta-spodumene form and the surfaces still have a substantial beta-eucryptite component.

Preferably, the temperature increase from the beta-eucryptite forming temperature into the beta-spodumene forming range is limited to no more than about 150° C.

A specific example of a preferred heat treating schedule is as follows:

Raise temperature from room temperature to 1100° F. (593° C.) over 3 hours;

Hold at 1100° F. (593° C.) for 2 hours;

Raise temperature to 1285° F. (696° C.) over 2 hours;

Raise temperature to 1325° F. (718° C.) over 1 hour;

Increase temperature to 1385° F. (752 ° C.) over 6 hours;

Hold at 1385° F. (752° C.) for 2hours;

Increase temperature to 1400° F. (760° C.) over 2 hours;

Increase temperature to 1615° F. (880° C.) over 1.5 hours;

Hold at 1615° F. (880° C.) for 2 hours.

Permit kiln to cool.

It should be noted that the size, construction, and thermal capacity of a kiln influence its performance, and therefore the optimum heating schedule for a particular kiln may vary from the specific, preferred schedule set forth above.

The resulting crystallized article has a surface layer rich in beta-eucryptite which has been found to be typically about 40 microns thick, with the remainder of the article being predominantly beta-spodumene. This differential in crystal formation between the surface and the interior is believed to arise from small compositional differences due to loss of volatile constituents from the surface portions, chiefly ZnO, $K_2O$, and $Sb_2O_5$, and possibly also $H_2O$, $Li_2O$, and F. The reduced concentration of these constituents in the surface portions may be seen in Table I, where the compositions of several examples of a preferred type of glass-ceramic, as determined by X-ray fluorescence, is shown before and after grinding and polishing the surfaces of crystallized plates. It has been found that compositions of the type shown in Table I inherently exhibit sufficient compositional differences between the surface and the interior so that, when crystallized in accordance with the method described above, the desired differential surface crystallization and compression strengthening are obtained in most cases. If the crystallizable glass articles are found to have insufficient compositional differences between the surfaces and the interiors, the more volatile components may be depleted from the surfaces by heating the articles prior to crystallization, such as by an extended annealing process.

The coefficients of thermal expansion (in the range 25°-300° C.) are $-17 \times 10^{-7}$/° C. for beta-eucryptite and $-3 \times 10^{-7}$/° C. for beta-spodumene. Both are negative and thus expand as they are cooled. Because the coefficient for beta-eucryptite is more negative than that for beta-spodumene, the beta-eucryptite rich layer at the surface of the crystallized article expands more rapidly upon cooling down from the crystallization temperature than does the beta-spodumene rich interior. The result is a zone of compression at the surface of the finished article and a zone of tension in the interior of the article, with the strength of the article thereby being increased. The depth of the compression layer has been observed to be about 40 microns in the preferred embodiments, but significant enhancement of strength can be attained with considerably smaller depths (for example, about 5 microns). The boundaries of the compression layer have been found to be quite abrupt, which suggests that the beta-eucryptite rich surface layer is approximately co-extensive with the compression layer.

Plates of the preferred composition crystallized and strengthened in accordance with the present invention, subjected to the standard concentric ring strength test, were found to exhibit an average strength about 22% greater than comparable plates of essentially the same composition crystallized fully to beta-spodumene. Table II shows the comparative strength date. The crystallizing heat treatment schedule to which the strengthened samples were submitted was the same as the specific preferred schedule set forth above with the exception that the maximum temperature was 1625° F. (885° C.).

TABLE I

| | Percent by Weight | | | | | |
|---|---|---|---|---|---|---|
| Constituent | Ex. 1 | Ex. 2 | Ex. 3 | Ex. 4 | Ex. 5 | Ex. 6 |
| Surface: | | | | | | |
| $SiO_2$ | 70.85 | 70.69 | 70.71 | 70.32 | 70.73 | 70.29 |
| $Al_2O_3$ | 18.90 | 19.28 | 19.26 | 19.27 | 19.16 | 19.33 |
| $ZrO_2$ | 1.50 | 1.47 | 1.47 | 1.52 | 1.50 | 1.51 |
| ZnO | 1.45 | 1.51 | 1.48 | 1.59 | 1.47 | 1.60 |
| $Fe_2O_3$ | 0.053 | 0.056 | 0.061 | 0.048 | 0.060 | 0.049 |
| $TiO_2$ | 2.31 | 2.09 | 2.11 | 2.13 | 2.31 | 2.11 |
| $K_2O$ | 0.10 | 0.13 | 0.12 | 0.27 | 0.10 | 0.26 |
| $As_2O_5$ | 0.01 | 0.01 | 0.01 | 0.01 | 0.01 | 0.01 |
| $Sb_2O_5$ | 0.33 | 0.32 | 0.32 | 0.33 | 0.33 | 0.33 |
| Interior: | | | | | | |
| *$Na_2O$ | 0.32 | 0.32 | 0.32 | 0.32 | 0.32 | 0.32 |
| *$Li_2O$ | 3.98 | 3.98 | 3.98 | 3.98 | 3.98 | 3.98 |
| *F | 0.20 | 0.20 | 0.20 | 0.20 | 0.20 | 0.20 |
| $SiO_2$ | 70.30 | 70.31 | 70.32 | 70.32 | 70.32 | 70.32 |
| $Al_2O_3$ | 19.22 | 19.27 | 19.27 | 19.24 | 19.24 | 19.29 |
| $ZrO_2$ | 1.52 | 1.50 | 1.50 | 1.52 | 1.52 | 1.51 |
| ZnO | 1.64 | 1.63 | 1.64 | 1.60 | 1.62 | 1.59 |
| $Fe_2O_3$ | 0.046 | 0.048 | 0.049 | 0.048 | 0.047 | 0.050 |
| $TiO_2$ | 2.12 | 2.10 | 2.10 | 2.13 | 2.11 | 2.11 |
| $K_2O$ | 0.29 | 0.29 | 0.26 | 0.27 | 0.29 | 0.26 |
| $As_2O_5$ | 0.01 | 0.01 | 0.01 | 0.01 | 0.01 | 0.01 |
| $Sb_2O_5$ | 0.35 | 0.34 | 0.34 | 0.35 | 0.35 | 0.34 |

*(Only bulk analysis by wet chemical techniques available.)

TABLE II

| | No. of Samples | Size (cm) | Thickness (mm) | Side in Tension | Strength (psi) |
|---|---|---|---|---|---|
| All spodumene | 16 | 16.5 × 16.5 | 3.6 | Top | 18,200 |
| | 20 | 16.5 × 16.5 | 4.6 | Top | 19,300 |
| | 19 | 16.5 × 16.5 | 5.3 | Top | 18,300 |
| | | | | average | 18,600 |
| Invention | | | | | |
| | 9 | 15.2 × 15.2 | 4.5 | Top | 27,600 |
| | 9 | 15.2 × 15.2 | 4.5 | Bottom | 17,700 |
| | | | | average | 22,700 |

When the invention is carried out in accordance with the preferred embodiments, strengthened, crystallized plates about 4 to 5 millimeters thick usually exhibit average transmittance to visible light (380 to 700 manometers) of at least 30%, more typically around 50%, and in some cases about 70% or greater. Table III shows radiant energy transmittance of three typical plates representing borderline, average, and excellent transparency.

TABLE III

| | Transmittance (%) | | |
|---|---|---|---|
| | A | B | C |
| Thickness (mm) | 4.75 | 4.72 | 4.60 |
| Luminous (visible solar, 380-700 nm) | 70.8 | 60.2 | 38.0 |
| Total solar ultraviolet | 5.2 | 3.3 | 2.1 |
| Total solar infrared | 84.4 | 83.4 | 77.9 |
| Total solar energy | 75.1 | 69.4 | 56.5 |

While detailed descriptions of specific embodiments have been set forth for the purpose of disclosing the best mode of practicing the invention, it should be understood that variations and modifications within the ordinary skill of the art may be resorted to within the scope of the invention as defined by the claims. For example, while the beta-eucryptite and beta-spodumene system has been specifically disclosed, any glass-ceramic may be used which forms two crystalline forms successively, the first have a lower coefficient of thermal expansion than the second.

I claim:

1. A method for producing strengthened, translucent, crystallized glass-ceramic articles, comprising the steps of:

heating a glassy article comprising by weight:

| | |
|---|---|
| $SiO_2$ | 67-73 |
| $Al_2O_3$ | 18-21 |
| $TiO_2$ | 1.4-5.0 |
| $Li_2O$ | 2.5-5.0 |
| $ZrO_2$ | 0-2.0 |
| $ZnO$ | 0.5-2.0 |
| $Sb_2O_3$ | 0-1.0 |
| $As_2O_5$ | O-1.0 |
| $Na_2O$ | 0-1.0 |
| $K_2O$ | 0-1.0 |
| $Cl_2$ | 0-0.2 |
| $F_2$ | 0-0.5 |
| $MgO$ | 0-3.0 |
| $CaO$ | 0-4.0 |
| $P_2O_5$ | 0-1.5 |

to a first temperature range within which beta-eucryptite crystallization takes place;

maintaining the article within said first temperature range for a time sufficient to transform substantially the entire article to a predominantly crystalline phase of the beta-eucryptite form;

raising the temperature of the crystallized article sufficiently slowly and uniformly to avoid thermal imbalances in the article to a second temperature range within which beta-eucryptite transforms to beta-spodumene and wherein the transformation from beta-eucryptite to beta-spodumene in surface portions of the article is retarded relative to the transformation in interior portions of the article;

maintaining the article within said second temperature range for a sufficient time to transform the predominant crystal form within interior portions of the article to beta-spodumene, but insufficient to complete transformation of the beta-eucryptite in surface portions of the article;

reducing the temperature of the article below said second temperature range so as to fix the beta-eucryptite content of the surface portions at a substantially higher concentration than the interior portions; and reducing the temperature further, thereby establishing zones of compression near the surface of the article and zones of tension in inner portions of the article by virtue of a difference between the coefficient of thermal expansion of the beta-eucryptite-rich surface portions and the beta-eucryptite-poor interior portions.

2. The method of claim 1 wherein said first temperature range is above 700° C. and said second temperature range is above 860° C.

3. The method of claim 2 wherein the rise in temperature from said first range to said second range is no more than 150° C.

4. The method of claim 1 wherein crystallization is carried out for a sufficient length of time to render the article at least 95% crystalline.

5. The method of claim 1 wherein the article is a plate 4 to 5 millimeters thick, and the heating in said second temperature range is halted before visible light transparency of the sheet falls below 30 percent.

6. A strengthened, translucent, crystallized glass-ceramic article having a transparency to visible light of at least 30% through a 4 to 5 millimeter thickness and a bulk composition comprising by weight:

| | |
|---|---|
| $SiO_2$ | 67-73 |
| $Al_2O_3$ | 18-21 |
| $TiO_2$ | 1.4-5.0 |
| $Li_2O$ | 2.5-5.0 |
| $ZrO_2$ | 0-2.0 |
| $ZnO$ | 0.5-2.0 |
| $Sb_2O_3$ | 0-1.0 |
| $As_2O_5$ | O-1.0 |
| $Na_2O$ | 0-1.0 |
| $K_2O$ | 0-1.0 |
| $Cl_2$ | 0-0.2 |
| $F_2$ | 0-0.5 |
| $MgO$ | 0-3.0 |
| $CaO$ | 0-4.0 |
| $P_2O_5$ | 0-1.5 |

and comprising a predominant crystalline phase dispersed in a glassy matrix, the majority of the crystalline phase of the bulk of the article being beta-spodumene, and the majority of the crystalline phase at the surface of the article being beta-eucryptite, so that surface portions of the article are stressed in compression and interior portions of the article are stressed in tension due to different coefficients of thermal expansion.

7. The article of claim 6 wherein transparency to visible light is at least 50% through a 4 to 5 millimeter thickness.

8. The article of claim 6 wherein the surface portion in compression is at least 5 microns deep.

9. The article of claim 6 wherein the crystalline phase comprises at least 95% of the article.

* * * * *